US010689206B2

(12) United States Patent
Bauer et al.

(10) Patent No.: US 10,689,206 B2
(45) Date of Patent: Jun. 23, 2020

(54) TRANSPORT DEVICE FOR TRANSPORTING PUCKS

(71) Applicant: KRONES AG, Neutraubling (DE)

(72) Inventors: Veronika Bauer, Regensburg (DE); Thomas Mildner, Kümmersbruck (DE); Michael Jogsch, Barbing (DE); Johannes Duenzinger, Unterdeggenbach (DE); Stefan Heigl, Obermotzing (DE); Peter Muehlstein, Koefering (DE); Christian Paul, Pentling (DE)

(73) Assignee: KRONES AG, Neutraubling (DE)

( * ) Notice: Subject to any disclaimer, the term of this patent is extended or adjusted under 35 U.S.C. 154(b) by 13 days.

(21) Appl. No.: 16/118,944

(22) Filed: Aug. 31, 2018

(65) Prior Publication Data

US 2019/0071257 A1 Mar. 7, 2019

(30) Foreign Application Priority Data

Sep. 4, 2017 (DE) .................. 10 2017 215 455

(51) Int. Cl.
*B65G 47/28* (2006.01)
*B65G 47/51* (2006.01)
(Continued)

(52) U.S. Cl.
CPC ............ *B65G 47/28* (2013.01); *B65B 61/025* (2013.01); *B65C 9/02* (2013.01); *B65G 47/5145* (2013.01);
(Continued)

(58) Field of Classification Search
CPC ........ B65G 2201/0261; B65G 47/5145; B65G 47/5186; B65G 47/28; B65G 47/82;
(Continued)

(56) References Cited

U.S. PATENT DOCUMENTS 3,776,395 A 12/1973 Lingg et al.
5,295,570 A * 3/1994 Grecksch ........... B65G 21/2009
198/465.1
(Continued)

FOREIGN PATENT DOCUMENTS

DE 102011080441 A1 2/2013
DE 102013218394 A1 3/2015
(Continued)

OTHER PUBLICATIONS

European Search Report for Application No. 18179764.8, dated Jan. 25, 2019.
(Continued)

*Primary Examiner* — Mark A Deuble
(74) *Attorney, Agent, or Firm* — Marshall, Gerstein & Borun LLP

(57) ABSTRACT

The invention provides a transport device for transporting pucks which are configured for container transport, comprising a puck transport section for transporting pucks to and from a container treatment machine. The transport device comprises a puck buffer from which pucks can be coupled into the puck transport section and to which pucks decoupled from the puck transport section can be fed.

19 Claims, 2 Drawing Sheets

(51) Int. Cl.
*B65B 61/02* (2006.01)
*B65C 9/02* (2006.01)
*B65G 47/84* (2006.01)
*B65G 47/82* (2006.01)

(52) U.S. Cl.
CPC ............ *B65G 47/82* (2013.01); *B65G 47/841* (2013.01); *B65G 2201/0261* (2013.01)

(58) Field of Classification Search
CPC .. B65G 47/841; B65G 47/842; B65G 47/843; B65B 61/025; B65C 9/02
USPC ......... 198/347.1, 347.4, 465.1, 465.2, 465.4, 198/867.01–867.08
See application file for complete search history.

(56) References Cited

U.S. PATENT DOCUMENTS

| | | | | |
|---|---|---|---|---|
| 5,718,323 A | * | 2/1998 | Flix | ....................... B65G 47/082 198/459.1 |
| 5,853,077 A | | 12/1998 | Schmitt | |
| 5,941,366 A | * | 8/1999 | Quinlan | ............... B65G 17/002 198/465.1 |
| 7,958,987 B2 | * | 6/2011 | Monti | ..................... B65B 57/16 198/347.1 |
| 2007/0000206 A1 | | 1/2007 | Berger et al. | |
| 2012/0261233 A1 | * | 10/2012 | Huettner | ................ B65G 47/28 198/459.1 |
| 2013/0330437 A1 | * | 12/2013 | Zacche | ............... B29C 49/4205 425/526 |

FOREIGN PATENT DOCUMENTS

| | | |
|---|---|---|
| DE | 102013112091 A1 | 5/2015 |
| EP | 1281643 A1 | 2/2003 |
| EP | 1645340 A1 | 4/2006 |
| EP | 2848416 A1 | 3/2015 |
| EP | 2889238 A1 | 7/2015 |
| WO | WO-2004/110905 A1 | 12/2004 |

OTHER PUBLICATIONS

German Search Report for Application No. 102017215455.1, dated Mar. 1, 2018.

* cited by examiner

TRANSPORT DEVICE FOR TRANSPORTING PUCKS

CROSS-REFERENCE TO RELATED APPLICATIONS

This application claims priority to German patent application DE 10 2017 215 455.1, filed Sep. 4, 2017, which is hereby incorporated by reference in its entirety.

FIELD OF THE DISCLOSURE

The invention refers to a transport device for transporting pucks which are configured for transporting containers, comprising a puck transport section for transporting pucks to a container treatment machine, in particular to a direct printing machine or a labeler, and away from the container treatment machine.

DESCRIPTION OF THE PRIOR ART

It is known in container treatment plants to transport containers between different regions of the treatment plants, especially to or away from container treatment machines, for example labelers or direct printing machines, upright in pucks. One container is respectively transported upright in a puck. For this purpose the pucks have holders in which the containers are standing and by the walls of which the containers are supported laterally.

For example, pucks are transported along a puck transport section to the infeed of a container treatment machine, where the containers are transferred to the container treatment machine via an infeed starwheel and treated there.

After treatment in the container treatment machine, the containers are removed from the container treatment machine with an outfeed starwheel, put again into pucks and transported away from the container treatment machine while standing in pucks.

An intermediate starwheel, which forms the counterpart to the infeed starwheel and outfeed starwheel, respectively, is provided to remove the containers from the pucks and transfer them to the infeed starwheel or to take the containers from the outfeed starwheel and insert them into the pucks. The intermediate starwheel can be configured as a lifting starwheel which grips the containers and lifts them out of the pucks. The pucks themselves then continue to run from the infeed starwheel to the outfeed starwheel in order to be able to pick up the treated containers there.

In such transport devices, it is possible to use a three-starwheel arrangement in which the infeed starwheel and the outfeed starwheel share an intermediate starwheel, for example a lifting starwheel.

In this configuration, empty pucks are always transported away from the outfeed of the container treatment machine at the beginning of a batch of containers, as long as the first containers are treated in the container treatment plant. In addition, empty pucks must be transported behind the pucks that transport the last containers of a batch so that enough pucks are available for the transfer from the container treatment machine.

Furthermore, interruptions in the operation of the container treatment machine during the treatment of a batch are problematic, as the container treatment machine often has to be run so as to be emptied, without containers being further fed to the container treatment machine and thus without empty pucks following for removal from the container treatment machine. In this situation, pucks for taking over the containers that are already in the container treatment machine are therefore missing.

SUMMARY OF THE INVENTION

It is therefore the object of the invention to provide a transport device for transporting pucks in which the puck flow at the beginning and end of a batch and in the event of interruptions in the operation of the container treatment plant is optimized.

According to the invention, the object is achieved by the fact that the transport device according to the preamble of claim 1 comprises a puck buffer from which pucks can be coupled into the puck transport section and to which pucks decoupled from the puck transport section can be fed.

Thus, the pucks initially transported in an empty state away from the container treatment machine can be introduced into the puck buffer and temporarily stored there and then reintroduced as required, thus e.g. at the end of a batch or in the event of an interruption in the operation of the container treatment machine. This optimizes the container flow, especially at critical points in time in the process flow. The pre-feeding and post-feeding of additional pucks is not required.

The containers may be bottles, for example, conceivable in various formats, such as containers with a base that is round, oval, elongated with rounded ends or polygonal.

The container treatment machine can be of various types of machines, for example rotary machines. In particular, it can be a direct printing machine or a labeler.

The pucks can in principle be transport elements of any shape, which have a recess in which containers are transported upright and are supported and stabilized laterally by the walls of the recess.

In principle, the transport device can include any transport device for conveying pucks, in particular transport belts or conveyor chains. The pucks can be guided laterally by rails at least on subsections. For this purpose the pucks can particularly also have grooves in the outer wall into which the rails engage. This allows the pucks to be transported in a stable manner with a given orientation.

The puck transport section can be considered as a main transport section that transports the pucks from other regions of the plant to and from the container treatment machine into other regions of the plant, and along which the containers are also transported (except for the region where the containers are removed from the pucks and treated in the container treatment plant).

The puck buffer can be considered as a secondary transport section for pucks. It can include any conveyor for pucks, in particular one or more transport belts. In particular, this conveyor can be configured to operate independently of the conveyor of the main transport section (puck transport section). In particular, the puck buffer may comprise one or more transport belts which can be operated independently of the transport belt(s) of the puck transport section.

Pucks being coupled from the puck buffer into the puck transport section means that pucks located in the puck buffer can be introduced into or fed to the puck transport section. In particular, the pucks can be coupled automatically, for example by controlling a switch and/or changing the position of stoppers, switching on blocking starwheels and/or actuating a drive of certain conveying devices of the puck buffer and/or the puck transport section. The coupling can take place in a coupling region.

Pucks being decoupled from the puck transport section and fed to the puck buffer means that pucks can be discharged away from the puck transport section into the puck buffer. In particular, the pucks can be decoupled automatically, for example by controlling a switch and/or pushing the container using a pusher system. The decoupling can take place in a decoupling region.

The transport device may have elements configured and arranged in such a way that the pucks are aligned during or after coupling and/or decoupling.

The transport device can be configured in such a way that pucks can be coupled from the puck buffer into the puck transport section before an infeed of the container treatment machine and can be decoupled from the puck transport section and fed to the puck buffer after an outfeed of the container treatment machine.

The terms "before" and "after" the infeed or outfeed refer to the transport direction of the pucks during normal operation, for example when containers are delivered to the container treatment machine for treatment and removed from it after treatment.

The infeed of the container treatment machine is the region in which containers are removed from the pucks and transferred to the container treatment machine. The outfeed of the container treatment machine is the region in which containers are removed from the container treatment machine and reinserted into the pucks. In the infeed, for example, the infeed starwheel described above can be arranged and in the outfeed, the outfeed starwheel can be arranged.

For coupling and/or decoupling pucks, the transport device may comprise at least one guide and/or at least one puck barrier, for example in the form of a stopper or blocking starwheel, and/or a switch and/or a pusher system.

The advantage of guides or switches is that pucks are steered gently, which is particularly advantageous for pucks with containers. When using one or more guides, a puck barrier may be provided, especially when two puck streams converge, for example from the puck buffer and from the puck transport section. By means of the puck barrier, a puck inflow can be stopped and started efficiently and with precise timing. A switch has the advantage that it can simultaneously guide the pucks from one transport branch and stop them from the other transport branch. The advantage of a pusher system is that pucks can be diverted very quickly to another path.

In a coupling region in which the pucks can be coupled into the puck transport section, guides can be configured and arranged in such a way that pucks are coupled guided by guides from the puck buffer into the puck transport section.

In the coupling region, two transport branches, namely the transport branch on which pucks from other plant regions are delivered, and the transport branch of the puck buffer from which pucks can be coupled in, can be brought together to form a third transport branch, namely the transport branch, which then runs towards the infeed of the container treatment plant.

In order to switch between the normal puck supply and the coupling of pucks, a puck inflow from one of the two transport branches can be stopped and a puck inflow from the other transport branch can be permitted, and, in particular, it can be ensured at the same time that the pucks do not fall down and continue to reach the third transport branch.

For this purpose, (the) guides, for example rails or rods, which are configured and arranged for lateral guidance of the pucks, may be provided.

The puck inflow can be stopped in principle, for example, by stopping the respective conveyor, for example the respective transport belt.

Alternatively or additionally, at least one stopper can be configured and arranged in the coupling region in such a way that by adjusting the position of the at least one stopper it can be adjusted whether pucks are coupled in from the puck buffer or remain in the puck buffer. In particular, a stopper may be provided which is configured in such a way that the puck flow on the puck transport section can be stopped before the third transport branch in the transport direction. Thus, for example, only pucks from the second transport branch, i.e. from the puck buffer, can be transported further to the third transport branch, i.e. towards the container treatment machine.

The advantage of the stoppers is that they have an immediate effect and thus stop the container flow very precisely, while due to the inertia of the pucks a simple stoppage of the respective conveyor will develop its effect at a somewhat slower pace.

Alternatively, a blocking starwheel can be used, similar to the stopper, to stop the puck flow or to let it through.

It is also conceivable that a switch is provided in the coupling region, whereby the switch may, for example, comprise a pivotable guide rail or rod which in a first position blocks a puck flow out of the puck buffer, i.e. from the second transport branch, and at the same time guides pucks from the first transport branch to the third transport branch, i.e. guides incoming pucks along the puck transport section to the container treatment machine. The switch can also be configured and arranged in such a way that in a second position the puck flow from the first transport branch is blocked and at the same time pucks from the second transport branch, i.e. from the puck buffer, are guided to the third transport branch, i.e. to the puck transport section. Such a switch makes it possible that a puck barrier does not have to be provided for the first and second transport branch and improves the guidance of the pucks.

In a decoupling region, in which the pucks can be decoupled from the puck transport section, a pusher system can be configured and arranged in such a way that by actuating the pusher system pucks are decoupled and fed to the puck buffer.

Such a pusher system can include a pusher, which can be moved into the transport path of the pucks, so that pucks are pushed laterally and thus deflected. In particular, the pusher system can be configured in such a way that the pusher element is triggered automatically, for example controlled by a control device.

The advantage of such a pusher system is that pucks can be decoupled from the puck transport section very quickly.

Alternatively or additionally, a guide can be configured and arranged in the decoupling region so that the pucks are decoupled and fed to the puck buffer guided by means of the guide. This guide can be similar in configuration to the guide described in connection with the coupling region, for example as a rod or rail. Here, the guide is configured to divide transport branches (not to join transport branches as in the coupling region). For example, the guide may be v-shaped. Alternatively or additionally a switch, for example as already described in connection with the coupling region, is conceivable.

Furthermore, a guide can be provided which is arranged laterally on the conveyor, for example the transport belt, of the puck buffer in such a way that pucks which are decoupled from the puck transport section, in particular pucks pushed by the pusher system, cannot fall down laterally from the conveyor.

Examples of the transport routes or areas of the transport device are described below.

The transport device may comprise a first transport belt of the puck transport section, a second transport belt of the puck transport section and a transport belt of the puck buffer, the first transport belt, the second transport belt and the transport belt of the puck buffer running parallel, in particular directly adjacent to one another, in a or the coupling region in which the pucks can be coupled into the puck transport section, the second transport belt running between the first transport belt and the transport belt of the puck buffer.

"Directly adjacent to one another" in this application means that neighboring transport belts are arranged so close together that a puck can run from one transport belt to the other.

In such an arrangement, pucks transported on the first transport belt (for example from other plant areas) or on the transport belt of the puck buffer, i.e. pucks transported on an outer transport belt, can be diverted to the centrally located second transport belt, on which the pucks are further transported towards the container treatment machine. This is advantageous, as the deflection paths can be kept to a minimum. In connection with this arrangement, the guides described above (with stoppers if necessary) or the arrangement with a switch are particularly advantageous, since the movement of the pucks only has to be slightly deflected. This is particularly advantageous for pucks with containers.

The transport device may include a or the second transport belt of the puck transport section, a or the transport belt of the puck buffer and a third transport belt of the puck transport section. The third transport belt, the second transport belt and the transport belt of the puck buffer can run parallel, in particular directly adjacent to one another, in a or the decoupling region in which the pucks can be decoupled from the puck transport section, the second transport belt running between the third transport belt and the transport belt of the puck buffer.

In such an arrangement, pucks running out of the region of the container treatment machine on the centrally running second transport belt can either be decoupled by deflection in one direction or by deflection in the other direction onto the third transport belt and transported there to other plant regions. This is advantageous, as the deflection paths can be kept to a minimum. In connection with this arrangement, the guides described above are advantageous, especially in combination with the pusher system, wherein the pusher system is configured to decouple the pucks and the redirection to the third transport belt takes place via the guide.

Between the transport belt of the puck buffer and the second transport belt, one or more further transport belts can also run parallel and directly adjacent to the neighboring transport belts. This arrangement is advantageous in order to bridge any difference in the transport speed of the pucks on the second transport belt and on the transport belt of the puck buffer during operation.

A or the pusher system mentioned above for decoupling the pucks from the puck transport section can be configured to push the pucks from a (especially the second) transport belt of the puck transport section onto a or the transport belt of the puck buffer. In particular, the pusher system may include a pusher that is configured to push the puck sideways when triggered, thus diverting it. The pusher can be triggered automatically, in particular controlled by a control device.

The puck buffer can be configured in such a way that at least as many pucks can be received in the puck buffer as the container treatment machine to which the pucks are transported has container holding elements or treatment stations. This can mean, for example, that the transport device of the puck buffer is long enough to accommodate this number of pucks.

The transport device may also include a control device configured to control whether pucks are coupled from the puck buffer into the puck transport section and whether pucks are decoupled from the puck transport section and fed to the puck buffer. In particular, the control device may be configured to control the switches and/or the pusher system, in particular to trigger the pusher and/or the puck barrier, e.g. the stopper or blocking starwheel.

The invention also refers to a method for transporting pucks configured to transport containers, wherein the pucks are transported along a puck transport section to a container treatment machine, in particular to a direct printing machine or labeler, and away from the container treatment machine. The pucks are decoupled from the puck transport section and fed to the puck buffer and/or are coupled from the puck buffer into the puck transport section.

In particular after an outfeed of the container treatment machine, the pucks can be decoupled from the puck transport section and fed to the puck buffer and/or coupled from the puck buffer into the puck transport section before an infeed of the container treatment machine.

In particular, empty pucks can be decoupled from the puck transport section at the beginning of a batch, for example, and/or, at the end of a batch, for example, empty pucks can be coupled into the puck transport section.

This means that empty pucks are present in the puck buffer after decoupling, which can be coupled back into the puck transport section in an empty state if required, for example at the end of a batch.

Containers can be removed from the pucks in the infeed of the container treatment machine and transported further in the container treatment machine. The pucks from which the containers were removed can be transported directly further to the outfeed of the container treatment machine. The containers can be reinserted into pucks after passing through the container treatment machine. The pucks can be transported at a constant speed, especially on the puck transport section in the area of the container treatment machine.

At the beginning of a batch of containers, pucks can be decoupled from the puck transport section after transfer of the containers to the container treatment machine as long as no containers have yet reached the outfeed of the container treatment machine and the pucks are transported empty away from the outfeed of the container treatment machine.

Since the pucks cover a shorter distance between the infeed and outfeed of the container treatment machine than the containers and the containers are also treated, the pucks already arrive at the outfeed of the container treatment machine at the beginning of a batch before the first containers have been completely treated and arrive at the outfeed. These pucks can then be decoupled into the puck buffer for later use, for example. As soon as the first containers have reached the outfeed of the machine, where they are inserted into pucks, the pucks (which are now equipped with containers) are normally no longer decoupled. However, it is conceivable that in certain cases pucks fitted with containers may also be decoupled, for example if it is clear that the respective container represents rejects. Then the containers can be removed from the pucks in the puck buffer, for example manually.

At the end of a batch of containers, empty pucks can be coupled from the puck buffer into the puck transport section in such a way that the last containers of the batch are inserted into the pucks coupled in from the puck buffer after passing through the container treatment machine.

The transport path of pucks/containers in the area of the container treatment machine already described above also means that after the last container has been transferred to the container treatment machine and the puck thus becoming empty has been filled with a treated container, no further pucks are initially available from the (main) puck transport section. As a result, there are still several containers in the container treatment machine for which no puck is actually available, into which they can be inserted after treatment. By coupling in the pucks from the puck buffer, additional pucks can be made available so that all containers from the container treatment machine can be placed in pucks and transported away.

The puck buffer is particularly advantageous if the decoupling at the beginning of the batch is combined with the coupling at the end of the batch, because then exactly the right number of pucks is available.

If the operation of the container treatment machine is interrupted, especially during an emergency stop, the supply of pucks with containers to the container treatment machine can be interrupted. In order to let the container treatment machine run empty, containers already present in the container treatment machine are removed from the container treatment machine, while no pucks are freed up by removing containers and transferring them to the container treatment machine. In this situation, empty pucks can be fed from the puck buffer to the puck transport section (i.e. coupled into this section) so that the containers can be removed from the container treatment machine. This is also called idling and is similar to the end of a batch. When the container treatment plant then resumes operation, surplus empty pucks can be provided at the beginning, similar to at the beginning of a batch. These empty pucks can be fed into the puck buffer.

In other words, if the operation is interrupted, a similar effect occurs as at the beginning and end of a batch. This means that if the container treatment machine stops and there are still containers in the container treatment machine, empty pucks from the puck buffer can be used to transport away these containers still contained in the container treatment machine. When operation is then resumed, empty pucks are removed from the machine outfeed as at the beginning of a batch, which in turn can be fed to the puck buffer.

The pucks can be decoupled by means of a pusher system, for example the pusher system described above, whereby the pusher system pushes a puck from a transport belt of the transport section onto a transport belt of the puck buffer.

The methods described above can be carried out using one of the transport devices described above.

The invention also refers to the use of one of the transport devices described above for one of the methods described above for transporting pucks.

It goes without saying that the features and advantages mentioned in connection with the device are also applicable to the method and the use.

BRIEF DESCRIPTION OF THE DRAWINGS

Further features and advantages are explained below using the exemplary figures, in which.

DETAILED DESCRIPTION OF THE PREFERRED EMBODIMENTS

Figure 1:
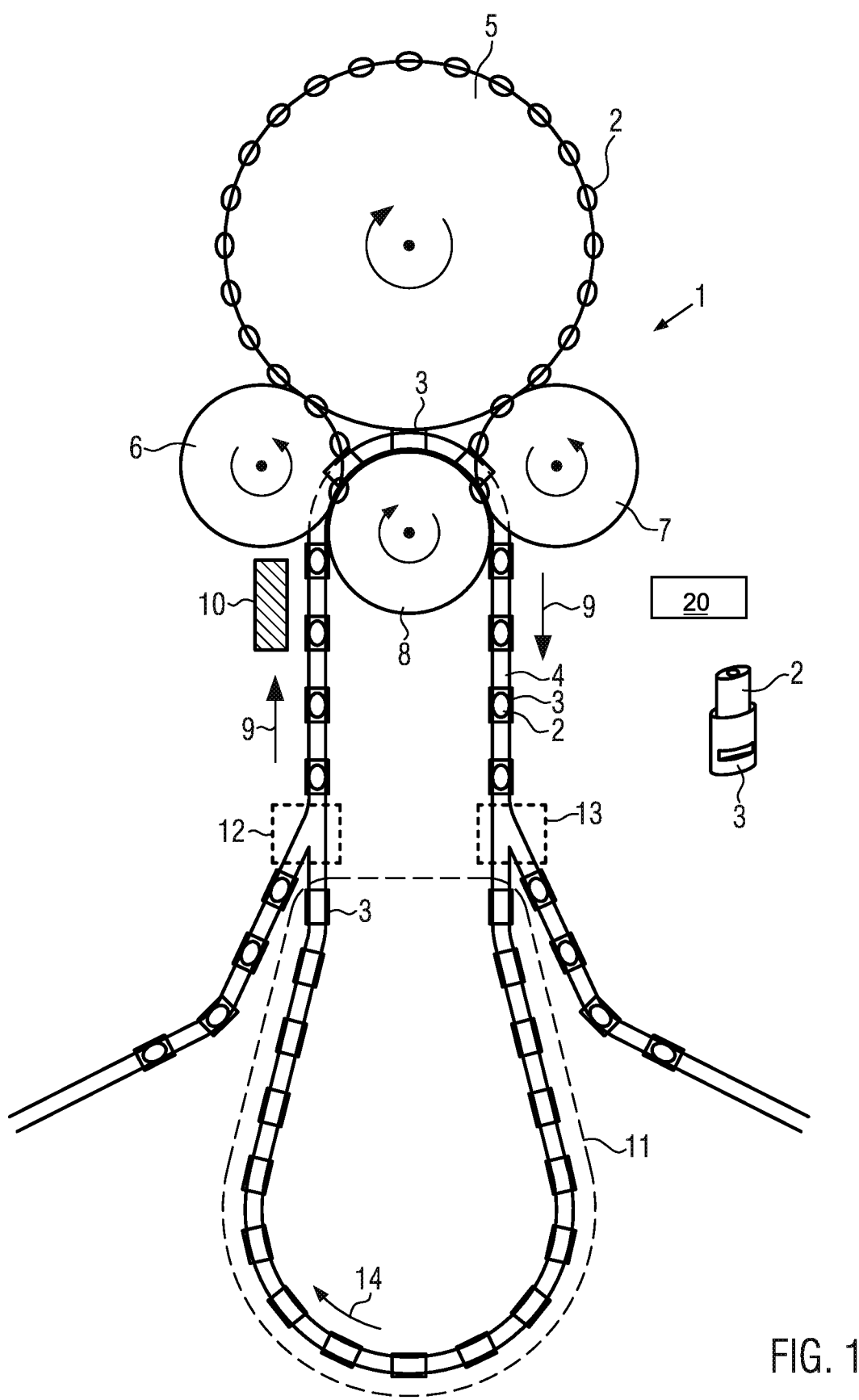
FIG. 1 shows a schematic, non-scaled plan view of a transport device for transporting pucks.

FIG. 1 shows a transport device 1 for transporting pucks 3, which are configured to transport containers 2, along a puck transport section 4 to and from a container treatment machine 5.

In this example, a rotary machine is shown as a container treatment machine, but any other container treatment machines can also be provided. The container treatment machine can be for example a direct printing machine, a labeler or other machines.

Furthermore, an infeed starwheel 6, an outfeed starwheel 7 and an intermediate starwheel 8 are shown here. That is, the figure shows a three-starwheel arrangement. The intermediate starwheel is preferably configured in the form of a lifting starwheel, which grips the containers, lifts them out of the pucks, transfers them to the infeed starwheel and then takes containers from the outfeed starwheel and reinserts them into a puck.

The infeed starwheel and the container treatment machine are arranged and configured in such a way that the infeed starwheel transfers containers to the container treatment machine in which the containers are transported and treated, for example printed. The outfeed starwheel is configured and arranged in such a way that, after containers have passed through the container treatment machine, it takes them from the container treatment machine and transfers them to the lifting starwheel, which then inserts the containers into the pucks.

The infeed and outfeed of the container treatment machine can also be configured differently than with the starwheels described above.

The transport device here comprises conveying elements for conveying pucks in the form of transport belts. Alternatively or additionally, other types of conveying elements can be provided, for example conveyor chains. The transport direction of the pucks is marked in the figure with the reference sign 9.

An infeed worm 10 can be provided at the machine infeed, which brings the pucks to a pitch distance which corresponds, for example, to a pitch distance of gripping elements of the intermediate starwheel.

The figure also shows a region 11, which represents a puck buffer. Furthermore, region 12 is shown on the infeed side and region 13 on the outfeed side. In the following, region 12 is also referred to as the coupling region, as pucks can here be coupled from the puck buffer into the puck transport section. Region 13 is referred to as the decoupling region, as pucks can here be decoupled from the puck transport section into the puck buffer.

There are different possibilities how the decoupling region and the coupling region can be configured. Such a possibility is described below in connection with FIG. 2.

The figure also shows the transport direction 14 of the pucks in the puck buffer. Furthermore, a control device 20 is shown, which can be configured in particular for controlling elements in the coupling or decoupling region.

Furthermore, the figure shows an example of a puck with a container in oblique view. The puck has exemplary grooves. If such grooves are provided, the puck can be guided at least temporarily by rails that engage in the grooves. However, this is not absolutely necessary.

Figure 2:
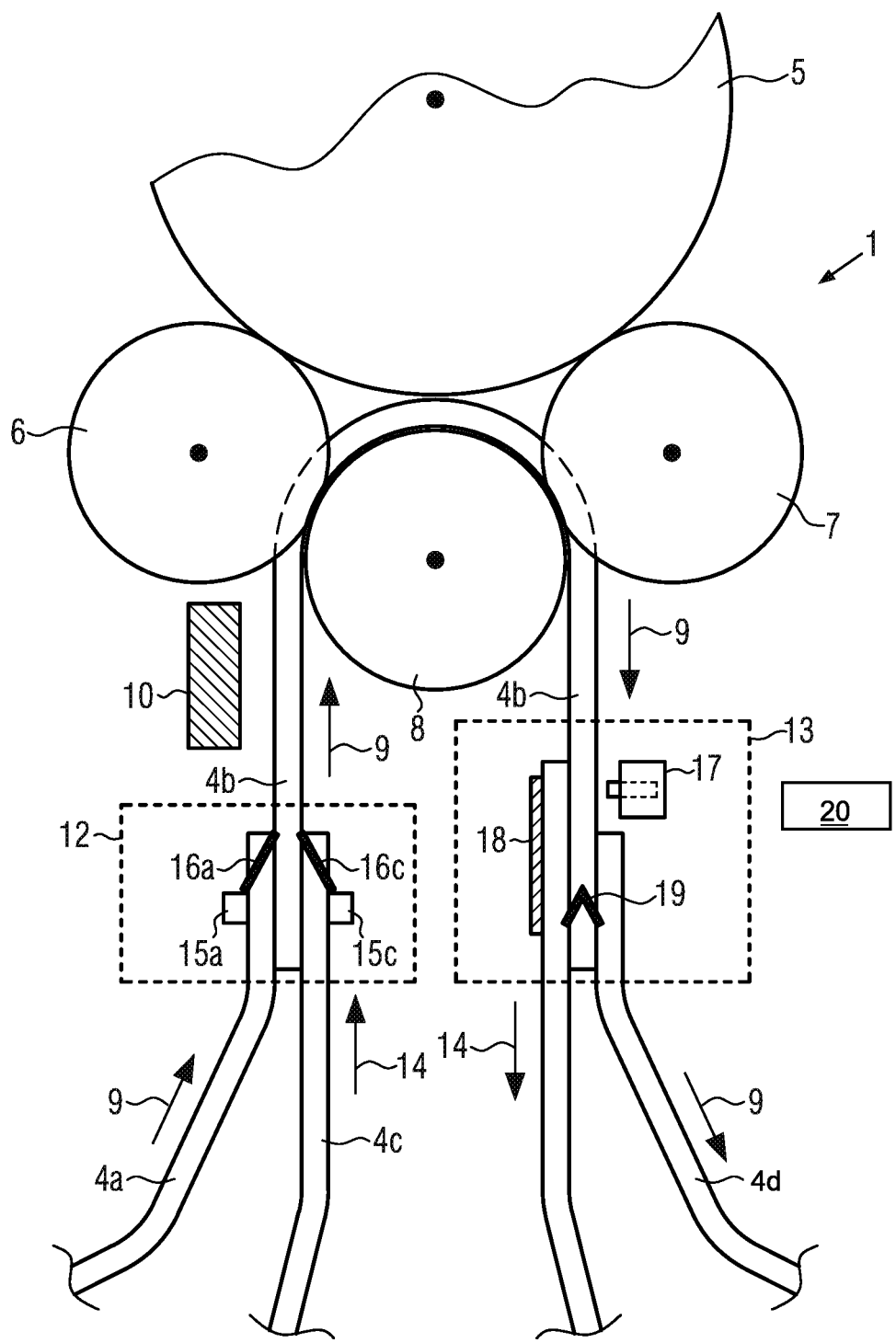
FIG. 2 shows a schematic, non-scaled plan view of a transport device for transporting pucks with exemplary detailed views of a coupling region and a decoupling region.

FIG. 2 shows an example of a container transport device with a possible configuration of the coupling region 12 and the decoupling region 13 in detail. This configuration of regions 12 and 13 can be used, for example, for the container transport device described in connection with FIG. 1 or for other container transport devices.

In this example, the pucks are coupled in the coupling region 12 by means of an arrangement of three transport belts which run parallel in region 12. The first transport belt 4a is the transport belt, which runs from other regions of the plant towards container treatment machine 5 to region 12. During operation, pucks with containers are fed here.

The second transport belt 4b leads from region 12 into the infeed of the container treatment machine. The transport belt 4c of the puck buffer extends between the decoupling region 13 and the coupling region 12. With this transport belt pucks can be coupled from the puck buffer into the puck transport section.

As can be seen here, the transport belt 4b runs on a subsection in region 12 between the transport belt 4a and the transport belt 4c.

The figure also shows stoppers 15a and 15c, each of which can stop the puck flow on the associated belt 4a and 4c, respectively, by adjusting their position accordingly. Alternatively, blocking starwheels could also be used. It is also possible that no blocking elements are provided.

Furthermore, guides 16a and 16c are shown, which lead pucks from the transport belt 4a and 4c, respectively, onto the transport belt 4b. By setting the stopper position (or by means of a blocking starwheel), in particular by controlling the stoppers with a control device, it can be set whether pucks from the transport belt 4a or from the transport belt 4c reach the transport belt 4b. In other words, it can be set whether pucks from the puck buffer are fed to or coupled into the puck transport section, or whether pucks from other plant regions are fed to the transport belt 4b via the transport belt 4a.

FIG. 2 also shows an example of how the decoupling region 13 can be configured. Here, transport belts 4b, 4c and 4d are arranged parallel side by side, whereby the transport belt 4b is arranged between the transport belts 4c and 4d. This refers to the end of the transport belt 4b, which leads out of the outfeed of the container treatment machine into the decoupling region 13, and the transport belt 4d, which leads from region 13 to other plant regions, respectively.

As can be seen here, a pusher system 17 is provided, which is configured in such a way that pucks, which are transported out of the outfeed of the container treatment machine, are each given an impulse or impact, which pushes the pucks onto the transport belt 4c. This can be done with a pusher. The pusher system can be controlled by a/the control device 20. In particular, the control device may be configured to control when the pusher is triggered to decouple a puck.

Furthermore, an optional boundary 18 is provided, for example a guide or a railing, which prevents the puck from falling down from the transport belt 4c. In addition, a guide 19 is shown here, which is arranged in such a way that pucks that are not pushed onto the transport belt 4c are guided from the transport belt 4b onto the transport belt 4d.

It should be noted that although a variant is shown here in which three transport belts are provided in the decoupling region 13, more transport belts may also be provided here, in particular four, with the additional transport belt(s) being arranged between the transport belt 4b and the transport belt 4c. This has the advantage that the additional transport belts can bridge a speed difference between the transport belt 4b and the transport belt 4c.

In the system described above, a guide is used in the coupling region 12 and a pusher system in the decoupling region 13. In principle, however, any mechanisms can be used to decouple or couple the pucks in regions 12 and 13. For example, pusher systems, guides, switches, blocking starwheels and stoppers can be used in suitable combinations. It should be noted, however, that for instance the pusher system, which is shown here in region 13, is particularly advantageous if empty pucks are to be deflected, since these are relatively light. A pusher system for pucks with containers is conceivable, but a system with switches and/or guides is more advantageous for filled pucks.

The following describes a method according to the invention that can be carried out, for example, with the devices described above or comparable devices.

In the container treatment operation, containers standing in pucks are transported in the direction of the container treatment machine along transport direction 9. If there is a device with the transport belts 4a to 4c, the pucks can, for example, be delivered on the transport belt 4a and then deflected in region 12 onto the transport belt 4b and transported further into the infeed of the container treatment machine on belt 4b.

At the infeed of the container treatment machine, the containers are removed from the pucks and transferred to the container treatment machine. For example, pucks can be brought with the infeed worm 10 to suitable distances so that the containers can be gripped by means of the intermediate starwheel 9 and lifted out of the pucks. For this purpose, the intermediate starwheel can, for example, comprise gripping elements which are lifted by a curve guide. The containers can then be transferred from the intermediate starwheel 8 to the infeed starwheel 6. The infeed starwheel, in turn, can transfer the containers to the container treatment machine 5. Other ways of transferring the containers to the container treatment machine are also possible, especially using other components.

In the container treatment machine, containers can be treated, for example printed or labeled, during the container treatment operation.

After passing through the container treatment machine, the containers are put back into pucks. For example, the outfeed starwheel 7 can remove the containers from the container treatment machine and transfer them to the intermediate starwheel 8, which takes over the containers, lowers them and reinserts them into pucks. Other ways of removing the containers from the container treatment machine are also possible, in particular by using other components.

After the containers have been removed, the pucks themselves, for example, pass through a section which corresponds approximately to the size of the intermediate starwheel 8. In the region of the container treatment machine, for example, deflection elements for transport belts and a transfer for the pucks can be provided to allow the pucks around a narrow curve.

After the containers have been reinserted into the pucks, the pucks with the containers are transported away from the container treatment machine. For example, this can be done using transport belts 4b and 4d. In particular, the pucks can be transported with the containers on the transport belt 4b into the decoupling region 13, where they are deflected onto the transport belt 4d and then transported to other plant regions, for example. Alternatively, the pucks can be decoupled here and fed to the puck buffer, for example by deflecting them onto the transport belt 4c of the puck buffer.

In the arrangement with the transport belts 4a to 4c and the stoppers, if containers are to be transported from other plant regions into the container treatment machine, the stopper 15c is in such a position that pucks located on the transport belt 4c are not transported onto the transport belt 4b. The stopper 15a is in a position where pucks are allowed to be transported from the transport belt 4a to the transport belt 4b. Alternatively, this function can also be implemented with a blocking starwheel. The setting of the position can be controlled automatically by a control device.

The following describes how to couple pucks from the puck buffer into the puck transport section using the configuration in FIG. 2. Pucks that are already in the puck buffer, for example on the transport belt 4c, are transported in the direction of transport, i.e. along arrow 14, into the coupling region 12. The stopper 15c is brought into a position so that the pucks are not stopped. Due to the guide 16c the pucks are then diverted to belt 4b and further transported in transport direction 9. The stopper 15a is arranged in a position that prevents pucks from being transported from the transport belt 4a onto the transport belt 4b. Coupling can also be done otherwise, especially with other components, such as switches.

Coupling can take place at the end of a batch if enough empty pucks are no longer provided by removing containers from pucks. Then an appropriate number of pucks can be coupled in from the puck buffer and the last containers of the batch can be removed. Alternatively or additionally, the coupling can also take place in the event of an interruption in the operation of the container treatment machine if it is run so as to be emptied.

The following describes a decoupling of pucks, i.e. when pucks are decoupled from the puck transport section and transported into the puck buffer, using the device shown in FIG. 2 as an example. The pusher system 17 is operated in such a way that pucks transported from the outfeed of the container treatment machine on the transport belt 4b are pushed onto the transport belt 4c, where they may hit the guide 18. The pucks are then transported further on the transport belt 4c in the direction of arrow 14. If necessary, guide 19 ensures that the pucks are transported guided on the transport belt 4c The coupling can also be done elsewhere, especially with other components.

The decoupling can take place at the beginning of a batch. Since the passage through the container treatment machine (including treatment of the containers) takes longer than the transport of the pucks between the infeed and outfeed of the container treatment machine, no containers are yet available for the first pucks in the outfeed, which containers could be inserted into the pucks. These pucks then run empty from the outfeed of the container treatment machine and can be decoupled and fed to the puck buffer.

In particular, decoupling at the beginning of a batch can also be combined with coupling at the end of this batch.

The coupling can also take place during an operational interruption of the container treatment machine if the container treatment machine is to be run so as to be emptied.

The decoupling can also take place after a restart of the container treatment machine after an interruption of operation, in particular after the emptying run described above, or in order to sort out pucks with containers which represent rejects. In the latter case, the method may also include the removal of the containers representing rejects from the pucks when these have reached the puck buffer.

It goes without saying that the features mentioned in the embodiments described above are not limited to these special combinations and are also possible in any other combinations.

The invention claimed is:

1. A transport device for transporting pucks which are configured to transport containers, comprising:
   a puck transport section for transporting pucks to a container treatment machine and away from the container treatment machine; and
   a puck buffer from which pucks can be coupled into the puck transport section and to which pucks decoupled from the puck transport section can be fed,
   the transport device configured such that the pucks are coupled from the puck buffer into the puck transport section before an infeed of the container treatment machine and are decoupled from the puck transport section and fed to the puck buffer after an outfeed of the container treatment machine.

2. The transport device according to claim 1, wherein, for coupling and/or decoupling the pucks, the transport device comprises at least one of a group including one or more guide, at least one puck barrier, a switch, and a pusher system.

3. The transport device according to claim 1,
   wherein in a coupling region in which the pucks can be coupled into the puck transport section, guides are configured and arranged such that pucks are coupled guided by guides from the puck buffer into the puck transport section.

4. The transport device according to claim 3, wherein in a coupling region in which the pucks can be coupled into the puck transport section, at least one stopper is configured and arranged such that by adjusting the position of the at least one stopper it is adjustable whether pucks are coupled in from the puck buffer or remain in the puck buffer.

5. The transport device according to claim 3, wherein in a coupling region in which the pucks can be coupled into the puck transport section, a blocking starwheel is configured and arranged such that by switching on the at least one blocking starwheel it is adjustable whether pucks are coupled in from the puck buffer or remain in the puck buffer.

6. The transport device according to claim 1,
   wherein in a decoupling region, in which the pucks can be decoupled from the puck transport section, a pusher system is configured and arranged such that by actuation of the pusher system pucks are decoupled and fed to the puck buffer.

7. The transport device according to claim 6, wherein a guide is configured and arranged in a decoupling region such that the pucks are decoupled and fed to the puck buffer guided by means of the guide.

8. The transport device according to claim 1,
   comprising a first transport belt of the puck transport section, a second transport belt of the puck transport section and a transport belt of the puck buffer,
   wherein the first transport belt, the second transport belt and the transport belt of the puck buffer run parallel, in particular directly adjacent to one another, in a or the coupling region in which the pucks can be coupled into the puck transport section, wherein the second transport belt runs between the first transport belt and the transport belt of the puck buffer.

9. The transport device according to claim 1,
   comprising a second transport belt of the puck transport section, a transport belt of the puck buffer and a third transport belt of the puck transport section, wherein the second transport belt, the transport belt of the puck buffer and the third transport belt run parallel, in a decoupling region, in which the pucks can be decoupled from the puck transport section, wherein the second transport belt runs between the third transport belt and the transport belt of the puck buffer.

10. The transport device according to claim 1, wherein the pusher system for decoupling the pucks from the puck transport section is configured for pushing the pucks from a transport belt of the puck transport section onto a transport belt of the puck buffer.

11. The transport device according to claim 1, wherein the puck buffer is configured such that at least as many pucks can be received in the puck buffer as the container treatment machine to which the pucks are transported has container holding elements and/or treatment stations.

12. A method for transporting pucks which are configured for transporting containers, the pucks being transported along a puck transport section to a container treatment machine and away from the container treatment machine,
wherein at least one of the pucks being decoupled from the puck transport section and fed to a puck buffer, or pucks are coupled from the puck buffer into the puck transport section,
wherein pucks are decoupled from the puck transport section and are fed to the puck buffer after an outfeed of the container treatment machine or are coupled from the puck buffer into the puck transport section before an infeed of the container treatment machine.

13. The method according to claim 12, wherein at least one of (1) empty pucks are decoupled from the puck transport section, or (2) empty pucks are coupled into the puck transport section.

14. The method according to claim 12, wherein containers are removed from the pucks in the infeed of the container treatment machine and are further transported in the container treatment machine and wherein the pucks from which the containers were removed are transported directly further to the outfeed of the container treatment machine, and containers are reinserted into pucks after passing through the container treatment machine.

15. The method according to claim 12, wherein at the beginning of a batch of containers pucks are decoupled from the puck transport section after the containers have been transferred to the container treatment machine, as long as no containers have yet reached the outfeed of the container treatment machine and the pucks are transported empty away from the outfeed of the container treatment machine.

16. The method according to claim 12, wherein empty pucks are coupled from the puck buffer into the puck transport section at the end of a batch of containers, such that the last containers of the batch are inserted into the pucks coupled in from the puck buffer after passing through the container treatment machine.

17. The method according to claim 12, wherein the supply of pucks with containers to the container treatment machine is interrupted upon interruption of the operation of the container treatment machine and empty pucks are fed to the puck buffer.

18. The method according to claim 12, wherein the decoupling of pucks is carried out by means of a pusher system, wherein a puck is pushed by the pusher system from a transport belt of the transport section onto a transport belt of the puck buffer.

19. The method according to claim 12, wherein if operation of the container treatment machine is resumed after an interruption, empty pucks are first fed from the puck buffer to the puck transport section before the supply of pucks with containers to the container treatment machine is resumed.

* * * * *